Oct. 11, 1938.　　　L. A. GARDNER　　　2,132,684
PRINTING TELEGRAPH AUTOMATIC EXCHANGE SYSTEM
Filed May 22, 1937　　　5 Sheets-Sheet 1

| FIG. 6 | | | |
|---|---|---|---|
| FIG. 2 | FIG. 3 | FIG. 4 | FIG. 5 |

INVENTOR
L. A. GARDNER
BY William P. Ballard
ATTORNEY

Oct. 11, 1938.  L. A. GARDNER  2,132,684
PRINTING TELEGRAPH AUTOMATIC EXCHANGE SYSTEM
Filed May 22, 1937  5 Sheets-Sheet 2

FIG. 3

INVENTOR
L. A. GARDNER
BY
William P. Barnard
ATTORNEY

Oct. 11, 1938.   L. A. GARDNER   2,132,684
PRINTING TELEGRAPH AUTOMATIC EXCHANGE SYSTEM
Filed May 22, 1937   5 Sheets-Sheet 5

FIG. 6

INVENTOR
L. A. GARDNER
BY William R. Ballard
ATTORNEY

UNITED STATES PATENT OFFICE

2,132,684

PRINTING TELEGRAPH AUTOMATIC EXCHANGE SYSTEM

Leland A. Gardner, Maplewood, N. J., assignor to American Telephone and Telegraph Company, a corporation of New York Application May 22, 1937, Serial No. 144,273

11 Claims. (Cl. 177—353)

This is a continuation in part of my abandoned application Serial No. 564,940, filed September 24, 1931.

This invention relates to communication systems and more particularly to printing telegraph automatic exchange systems adapted for stock quotation service.

An object of this invention is to obtain a more efficient information service for stock brokerage offices. More specifically stated, this object is to furnish in a more efficient and expeditious manner to stock brokers' offices, the latest "bid and asked" quotations of any stock only at such times as this information of a particular stock is desired.

Heretofore it has been necessary for stock brokers, when desiring the latest "bid and asked" quotations on any stock, to call a stock quotation clerk over a private line which terminated in a manually operated switchboard located at a stock exchange. The operator at this switchboard connected the calling party to the stock quotation clerk who kept a record of the "bid and asked" quotation of all stocks. These quotations were obtained from the stock specialist located at each trading post on the floor of the exchange. This arrangement requires considerable time to obtain the desired information and at times, especially during extraordinarily active periods at the exchange, subjects the brokers to considerable annoyance because of errors introduced by human agencies involved in completing the connections and in furnishing the information.

In accordance with the present invention the time required to obtain the desired information is greatly reduced and the liability of error due to human agencies is practically eliminated by the elimination of the telephone switchboard and the telephone service between the trading posts and the stock quotation clerk. From a generic aspect the present invention provides a station or stations at which the latest or other facts or information concerning particular subjects are stored or recorded in or upon automatic senders in connection with means whereby the information stored or recorded in the senders may be changed from time to time; lines or channels of transmission extend to a plurality of points, which may be the locations of subscribers to a service consisting in providing the information recorded in the automatic senders; subscribers' apparatus located at any one of a plurality of points, may be actuated to select at a central station a particular one of the automatic senders which, upon being selected, at once sends back to the subscriber the information stored therein.

A specific embodiment of the present invention comprises a system wherein the operators or stock specialists at each trading post of a stock exchange set up on storing senders the latest "bid and asked" quotation on all the stocks handled at their posts and a broker who is a subscriber to the service may, by operating on his telegraph typewriter, or what is generally known commercially as a teletypewriter machine, a set of keys corresponding to the code of any stock of which he desires the latest "bid and asked" quotation, be connected automatically through a selector mechanism at the exchange to a set of senders at which the desired information is stored. The operation of the keys by the broker sets up on the tape or page at the broker's typewriter, code letters of a particular stock and almost immediately therafter the desired "bid and asked" quotations are printed adjacent to the letters.

A feature of the invention is the provision of a printer at the exchange whereat the pull bars, in response to the code letters transmitted from the broker's office, control the operation of the mechanism for selecting the particular set of senders corresponding to the code letters transmitted by the broker.

Another feature of this invention resides in mechanisms and equipments whereby with single code combinations any one out of a number of devices may be selected equal in number to the number of variables of the code raised to the power representing the number of code elements necessary to make one selection; thus with a two-element code combined in permutations of five, one out of $(2)^5$ or 32 elements may be selected, by use of upper and lower case this number may be increased accordingly; to determine the number of selections made by two code combinations this number is squared, that is, any one out of $(32)^2$ or 1024 elements may be selected, by using upper and lower case this number may be doubled; if certain permutations are used for other purposes these numbers may be somewhat decreased and thirty effective upper and thirty effective lower case combinations are sometimes assumed as usable in commercial teletypewriter machines. When a "request" pulse is used as in the present disclosure after a selection, the total number of selections is $32+(32)^2$. With these permutations the possible number of selections is $(32)^3$ and with the use of "request" pulses the total number is extended to $$32+(32)^2+(32)^3.$$

This situation may be mentally visualized or physically arranged as selection of a single element out of a row with a single permutation combination; a single element out of a two-dimensional coordinate system or array by two permutation combinations; and a single element out of a three-dimensional system or array by three permutation combinations.

Still another feature of the invention is the provision of means for coordinately establishing a transmission circuit in response to signal combinations transmitted on a basis of one or more signal codes. In the arrangement disclosed here-
in there is provided a selecting mechanism responsive to one or more signal codes received over an incoming circuit for selectively operating any two coordinately positioned electromagnetic devices of a plurality of such devices to thereby effectively close a circuit extending to a connecting point whereat the desired information or function is available for use by the attendant at the transmitting machine from which the one or more signal codes were transmitted.

Only so much of the equipment that is essential to a clear understanding of the invention is shown.

Figures 1, 7, 8:
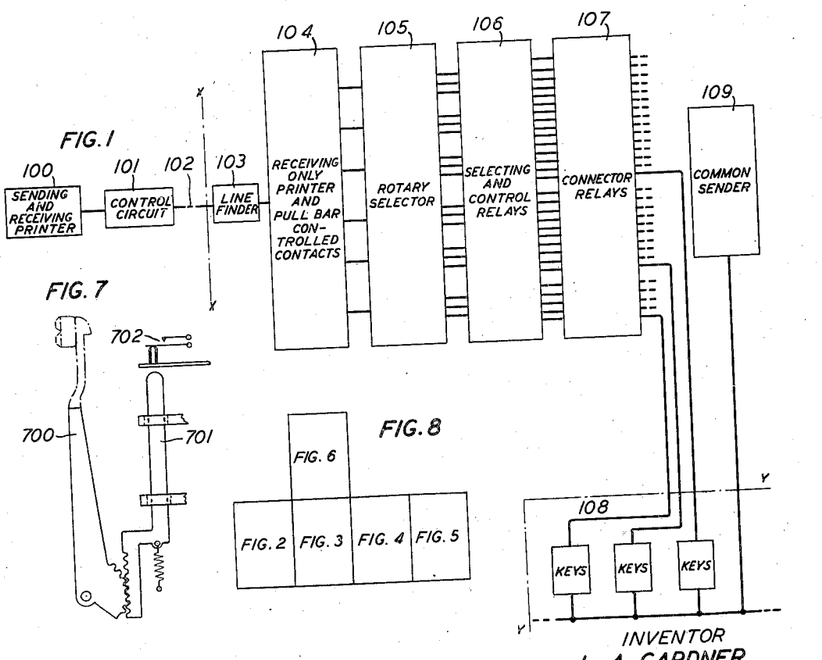
Figure 1 shows the schematic diagram of the complete system.
Fig. 7 shows the arrangement of a type and a pull bar on the "receiving only" printer wherein each pull bar when operated in response to each received signal closes momentarily a contact for operating the selecting mechanism.
Fig. 8 shows the arrangement of sheets of Figs. 2 to 6 which constitute the detailed layout of the complete system.

In Fig. 1 the equipment shown to the left of broken lines X—X, represents that required at a broker's office wherein a telegraph typewriter 100, comprising a sending and a receiving unit, is connected through a selecting, or control, circuit 101 to a line 102 extending to the stock exchange. The equipment shown to the right of broken line X—X is that of the stock exchange wherein the line 102 is connected through a line finder switch 103 to the receiving equipment 104. The receiving equipment comprises a "receiving only" printer which is provided with contact closing means at each of its pull bars, so that the operation of any pull bar in response to an incoming signal momentarily closes a set of contacts. The closure of one or more sets of contacts operates one or more rotary selector switches 105 respectively associated therewith, which in turn select and operate the necessary selecting and control relays 106. The joint operation of the selecting and control relays operates one of the connector relays 107 whereby the line 102 is associated through the closed contacts of certain pairs of keysets 108 at a trading post to the common sender 109. The equipments 103 to 107 and 109 are located in the apparatus room at the exchange, whereas the keysets 108 which are shown to the right and below the broken line Y—Y are located at one or more trading posts on the floor of the exchange. There is provided at each trading post one set of "bid" and one set of "asked" keys for each stock handled thereat.

Referring to the detailed layout, the broken line enclosure 200 contains a sending and receiving printer, that is, a printer comprising sending and receiving units, and the control circuit at the broker's office. Similar equipments are provided for each of the other brokers' offices which are connected to the exchange for this kind of service. At the broker's office a telegraph typewriter, represented diagrammatically by block 201 and comprising a transmitting unit T and a receiving unit R, is shown connected to the control circuit to the line 102. The printer may be of the type disclosed in United States Patent No. 1,567,392 granted to E. L. Kleinschmidt on December 29, 1925. Transmitting and receiving units are connected in series with the transmission line extending between the broker's office and the stock exchange, and are arranged to print on a common tape or page in the broker's teletypewriter characters representing both outgoing and incoming signals. The detailed description of the operation may be had by referring to the Kleinschmidt Patent No. 1,567,392 (Fig. 39). The initial operation for obtaining a quotation of a certain stock consists in closing a start switch S at the broker's telegraph typewriter 201 whereby a relay operates to close an opening in conductor 204 at a point within the telegraph typewriter. The closing of conductor 204 completes a circuit for automatically operating a line finder 209 which operates to hunt the calling line 102 and connect it to the selecting apparatus at the stock exchange. The apparatus for effecting this operation is not shown because line finders or non-numerical hunting switches of this character are well known in automatic switching signaling systems, particularly, those used in telephonic transmission. A line finder suitably adapted to the arrangement described herein is disclosed in United States Patent No. 1,557,609 granted to D. B. Perry on October 20, 1925, wherein the banks D and E correspond to banks 209' and 209" shown in Fig. 2 of the present application. It is understood, however, that the present application is not limited to the use of a single movement rotary line finder disclosed in United States Patent No. 1,557,609 because other well known types of line finders or non-numerical hunting switches, such as the step-by-step type disclosed in United States Patent No. 1,809,124 granted to H. Hovland on June 9, 1931, may be equally well applied. The next operation consists in sending signals from the telegraph typewriter by successively depressing one or two keys representing the symbols of some particular stock. In the arrangement described herein the symbol combination representing the stock may be of one or two letters. Combinations of one and two letters provide for more than a sufficient number of active stocks listed on the New York Stock Exchange. This request will arrive at the stock exchange and the combination of letters representing the stock of which the latest "bid and asked" quotations are desired, will effect the operation of a "receiving only" printer 200 (Fig. 3) of the type disclosed in United States Patent No. 1,745,633 granted to S. Morton and H. L. Krum on February 4, 1930. The symbols or code letters of the requested stocks are successively printed on the tape of the printer 201 at the broker's office. The transmitted symbols upon arriving at the "receiving only" printer 300 at the exchange select and operate one or more pull bars, depending on the number of letters in the transmitted symbol combination. No printing is done at printer 300. The selected pull bars are designed to move upward, in response to the operation of their respective associated selective mechanisms, and certain circuits are closed thereby making the selections of the proper relays for establishing a connection between the broker's line 102 and the source of information desired. A clearer understanding of the type and pull bar arrangement may be had by referring to Fig. 7 wherein the type bar 700 is connected in the manner shown to pull bar 701, and the pull bar due to its upward movement closes a circuit to be described later, over contact 702. A suitable type of "receiving only" printer whereof the pull bars may be adapted to operate sets of contacts, such as that designated 702, may be had by referring to United States Patent No. 1,745,633, supra.

Figure 2:
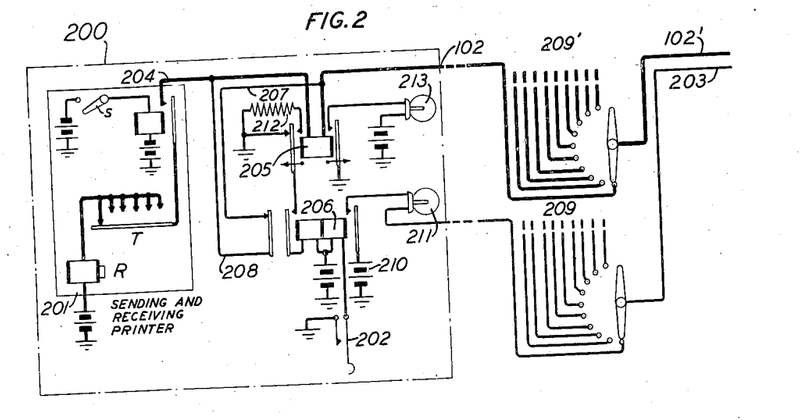
Fig. 2 shows the equipment at a broker's office and a line finder switch at the stock exchange to serve several brokers, for adopting one "receiving only" printer and its associated selecting mechanism to a certain incoming request.
Figure 3:
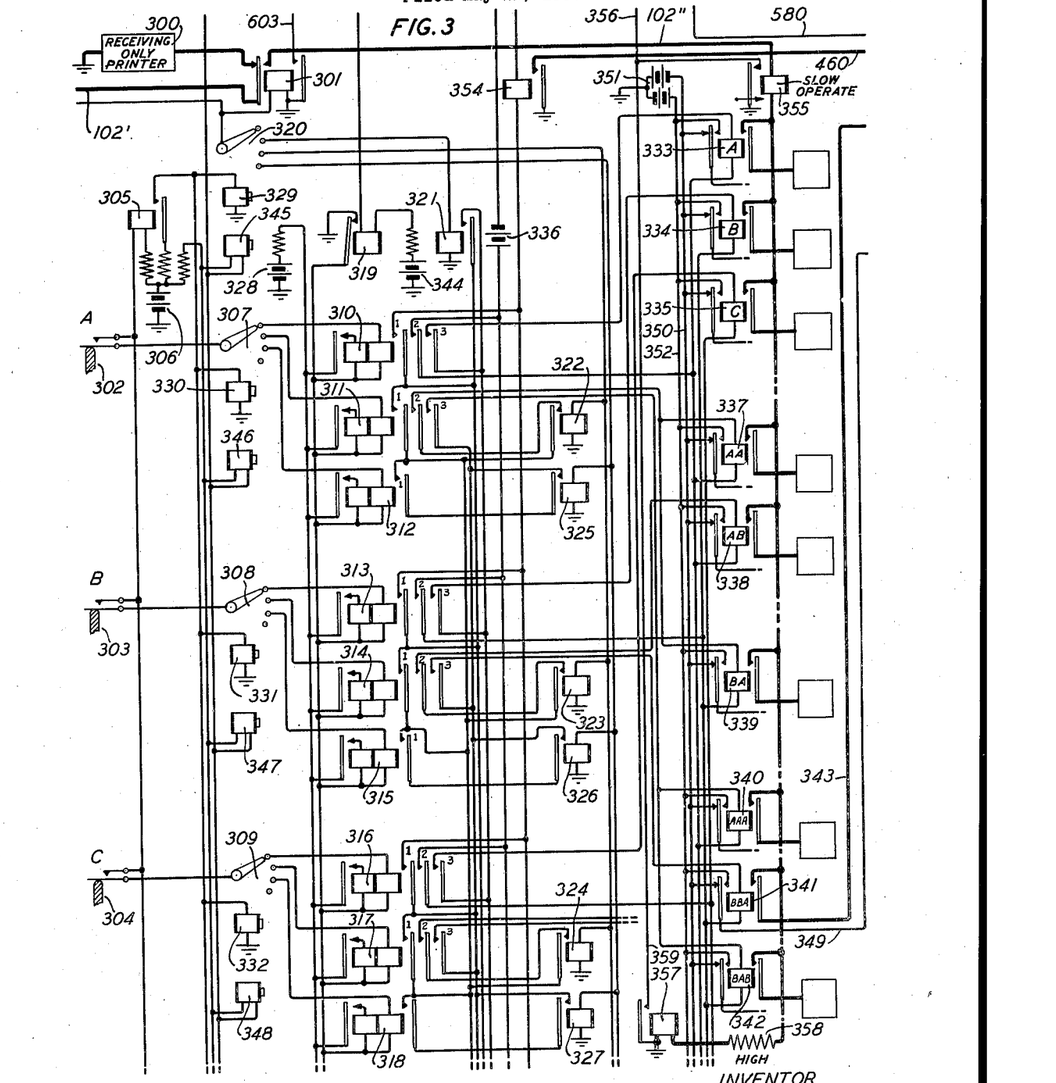
Fig. 3 shows a "receiving only" printer mechanism, the rotary selector switches, the selecting, the control, and the connector relays at the stock exchange.

Immediately following the operation of the keys of printer 201, transmitting the stock symbols over line 102, a "request" key 202 of the non-locking type is operated which results in a current being transmitted over an auxiliary line 203 to operate a transfer relay 301 at the exchange. The operation of relay 301 transfers the conductor 102′ from the "receiving only" printer 300 to the conductor 102″, and the line is now prepared to receive the "bid and asked" quotation from the sender at the exchange. Relay 301, when operated, also connects ground to a connector extending to a stepper switch operating circuit for a purpose hereinafter described.

Figure 5:
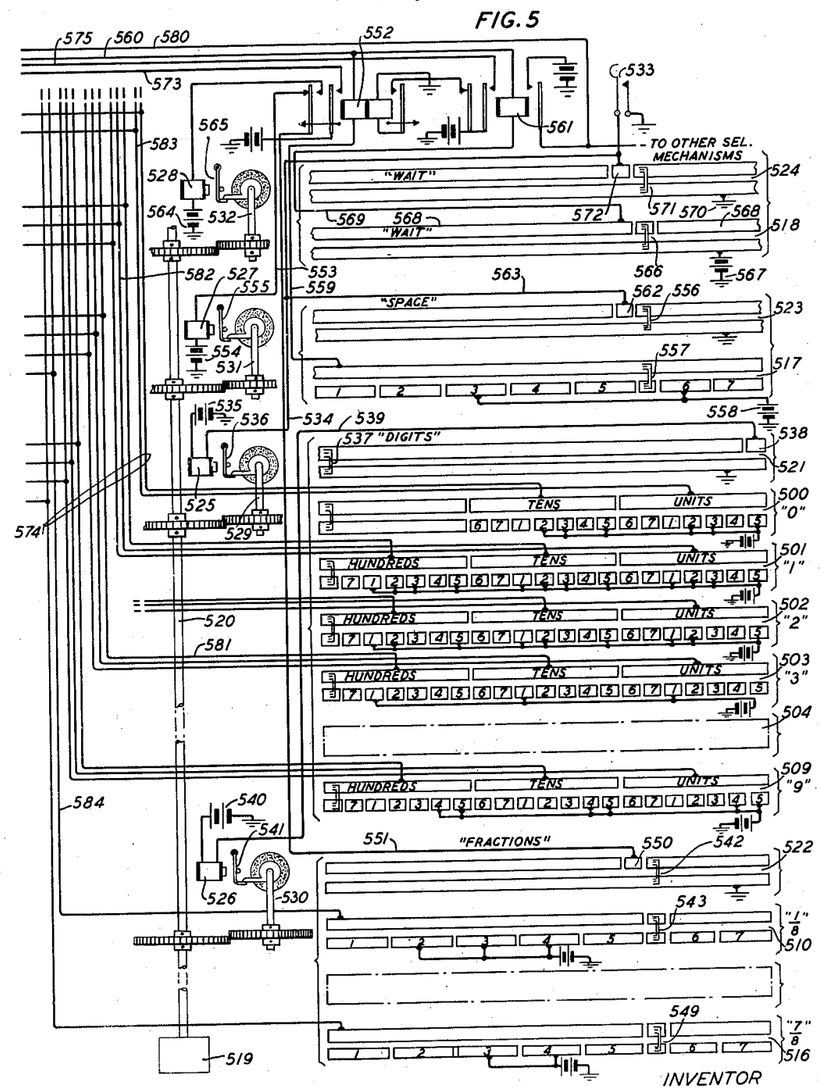
Fig. 5 shows the common sender and a driving mechanism therefor.

The sender, shown in Fig. 5, is common to the entire exchange and provides for a total of nineteen rotary distributors of the start-stop type. For the purpose of illustration, the ring sets of ten of the disributors are shown developed. Ten of these ring sets designated 500 to 509, inclusive, are for respectively sending the digits 0 to 9, inclusive, the lower ring of each set being provided with twenty-one segments in order that it may be capable of sending in the five-unit code any one figure or digit three times, that is, in the hundreds, tens and units places, every time its respectively associated brush completes one revolution. The twenty-one segments on each distributor are accordingly divided into three groups of seven segments each to correspond to the start and stop impulses required in addition to the five-unit impulses as employed in start-stop distributor systems. Seven ring sets 510 to 516, inclusive, are provided for respectively sending fractions of one-eighth to seven-eighths, in increments of one-eighth, the lower ring of each set being provided with seven segments consisting of the start-stop and five-unit code segments. One ring set 517 is provided for automatically sending a "space" impulse, the lower ring thereof being divided into seven segments, that is, start, stop and five-unit code segments, for this purpose. One ring set 518 is provided for automatically sending a "wait" impulse. The functions of the latter two distributors will be hereinafter described in detail.

A single driving motor 519 is employed for all the distributors. Each group of distributors, that is, those sending zero to nine, inclusive, the fractions, the "space" and the "wait" impulses, are geared to a common shaft 520 for the proper operating speed, and each group is driven through a clutch, as is customary in start-stop printer operation. The zero, the one-eighth, the "space" and the "wait" distributors are respectively provided with ring sets 521 to 524, inclusive, for operating clutch release relays 525 to 528, inclusive, as is also a customary arrangement. The four distributors for sending zero, one-eighth, "space" and "wait" impulses are respectively driven by shafts 529 to 532, inclusive, in the manner shown, the distributors sending the digits 1 to 9, inclusive, being mounted on shaft 529 and the distributors sending fractions one-quarter to seven-eighths, inclusive, being mounted on shaft 530. The rotatable brush arms for the digit distributors are rigidly attached to shaft 529 and they all start and stop simultaneously under the control of relay 525. A similar arrangement is employed on the fraction distributors which are under the control of relay 526. This control is had in the digit distributors through ring set 523 or 524 and in the fraction distributors through ring set 521. The "space" and the "wait" distributors are respectively controlled by relays 527 and 528, through the ring set 522, relay 527 being operated immediately after transmitting the fraction of the "bid" quotation and relay 528 being operated immediately after transmitting the fraction of the "asked" quotation.

Description of sender operation

In the following description it is assumed that the driving motor 519 has been started, as at the beginning of a day's run and that the brush arms for the zero, one-eighth, "space" and "wait" distributors are held at their respective latches, so that all distributors are standing still in their normal position. A momentary closing in their normal position of a non-locking start key 533 connects ground to conductor 534 through the winding of clutch release magnet 525 to grounded battery 535. Magnet 525 momentarily operates and releases latch 536 for the brush arms of distributors 0 to 9, inclusive. Each of the distributors, except the zero distributor, will in the course of rotation of its associated brush in completing one revolution, send the figure or digit for which it is connected, three successive times to represent a three-digit number. The "zero" distributor will not be required in the hundreds place so therefore the zero distributor will send "zero" twice during each revolution of its brush, that is, zero for each of the tens and units places. As to sending the third digit, that is, the number for the units place, ground is connected over brush 537, passing over segment 538 of ring set 521 which completes a circuit extending over conductor 539, through the winding of clutch release magnet 526 to grounded battery 540. Magnet 526 momentarily operates and releases latch 541 whereby the brushes 542 to 549, inclusive, start rotating to send the fractions one-eighth to seven-eighths, inclusive, one fraction being sent only once during a revolution of each of the brushes 543 to 549, inclusive. On completion of a revolution of the fractions' brush arm, ground is connected by brush 542, passing over segment 550 of ring set 522, whereby a circuit extending from ground over conductor 551, outer left armature and back contact of relay 552, conductor 553, through the winding of clutch release magnet 527 to grounded battery 554. Magnet 527 momentarily operates and releases latch 555 whereby brushes 556 and 557 start rotating to send impulses for a "space" signal for producing a space between the "bid" and "asked" quotations on the tape or page in the typewriter at the broker's office. As soon as brush 557 engages segment No. 6 of ring set 517, at the beginning of its rotation, a circuit is completed from grounded battery 558, segment No. 6, brush 557 and continuous ring of ring set 517, conductor 559 through the left-hand winding of relay 552, conductor 560, the outer left armature and back contact of relay 400 (Fig. 4), to ground. Relay 552 is of the slow-release type and therefore, in operating, holds up its armatures during the sending of the "space" impulse, or in other words, for the complete revolution of brush 557. Relay 552 closes a locking circuit for itself from ground through its right-hand winding, right armature and contact, outer left armature and contact of relay 561 to grounded battery. When brush 556 approaches its normal, or "stop" position, it engages a segment 562 of ring set 523 and closes an operating circuit for the clutch release magnet 525, which may be traced from ground at ring set 523, brush 556, segment 562, conductor 563, conductor 534, through the winding of magnet 525, to grounded battery 535.

At this time the "space" impulse is transmitted and the magnet 525 again momentarily operates to release latch 536 which allows the digit distributors to rotate. The digit distributors then transmit the digits of the "asked" quotations through the operated "asked" keys of the various stocks, as will be hereinafter described. At the completion of one revolution of the digit distributors the fraction distributors are allowed to rotate as hereinbefore described whereby the fractions of the "asked" quotations of the various stocks are transmitted through the operated fraction key at each of the trading posts, as will be also hereinafter described. When the fraction distributors complete one revolution a circuit is closed from ground at ring set 522, over brush 542, and segment 550, conductor 551, outer left armature and front contact of relay 552, through the winding of clutch release magnet 528 to grounded battery 564. Magnet 528 momentarily operates to release the latch 565 and the "wait" distributor comprising ring sets 518 and 524 begins rotating. The rotation of brush 566 over ring set 518 closes an operating circuit for relay 561, which may be traced from grounded battery 567, over brush 566, ring set 568 of ring set 518, conductor 569, through the winding of relay 561, conductor 560 to ground at the outer left armature of relay 400. When the "wait" distributor completes its revolution in transmitting the "wait" impulse which has a duration of about one-half of a second, a circuit is closed from ground 570, brush 571 and segment 572 of ring set 524, conductor 534, through the winding of release magnet 525 to grounded battery 535. The operation of magnet 525 again releases latch 536 whereby the digit distributors again begin rotating to transmit the digits of the "bid" quotations for the various stocks.

Thus, the operation of the "digits", "fractions" and "space" distributors in sequence is followed by the operation, in sequence of the "digits", "fractions" and "wait" distributors. In this way the first operation of the "digits" and "fractions" distributors transmits the digits and fractions of the "bid" quotations. Then the "space" distributor operates to provide a time or "space" interval during which the "digits" and "fractions" distributors are stationary and also to produce on the tape at the broker's office a space between the "bid" and "asked" quotations.

At the end of this time or "space" interval, the "digits" and "fractions" distributors again operate to transmit digits and fractions for the "asked" quotations and at the completion of one revolution of the "fractions" distributors the "wait" distributor is allowed to make one revolution before the "digits" distributors begin rotating again. This operation of the distributors is repeated over and over as long as the driving motor 519 is operated. The "wait" impulse which is transmitted by the "wait" distributor 518 prevents any change in the setting of the keys at the printing post until a set of "bid and asked" quotations have been transmitted. Some of the short segments of the "digits" and "fractions" distributors are shown connected to grounded battery, to produce the combinations of impulses necessary to form the various digits and fractions employed.

Figure 4:
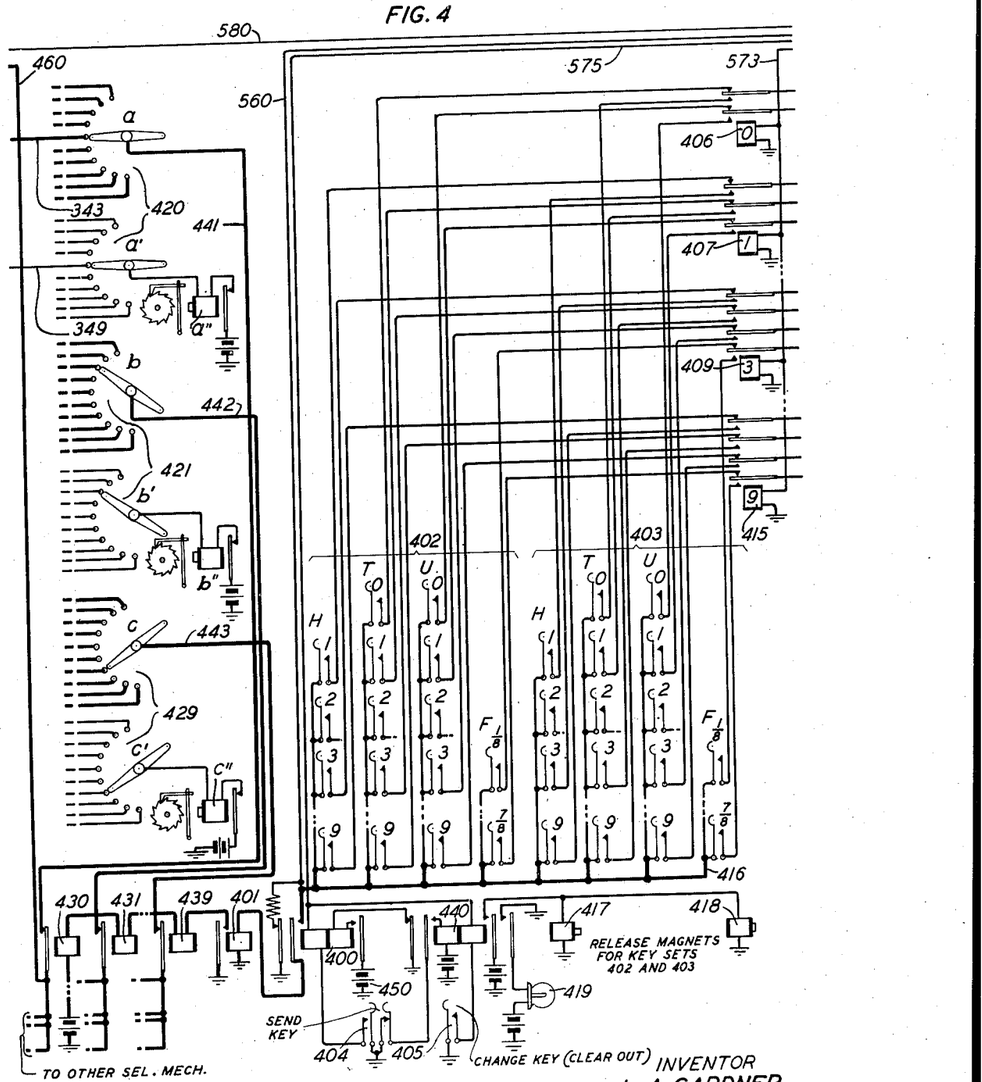
Fig. 4 shows two sets of keys for any one stock at a trading post on the floor of the exchange, there being two sets for each of the stocks handled at a trading post. Also there are shown the sender relays and the sender control equipment whereby more than one broker may be connected over the same key-set to the common sender.

The operation of relay 552 as hereinbefore described, closes an operating circuit for transfer relays 406 to 415, inclusive, which may be traced from grounded battery, inner left armature and contact of relay 552, conductor 573, through the windings of relays 406 to 415, in parallel, to ground. The ten relays 406 to 415 operate and transfer the sender conductor 574 from the "bid" set of keys 402 to the "asked" set 403, there being one transfer relay for each of the ten digits 0 to 9. Relays 405 to 415 further serve to effect the transfer of a separate conductor for the seven "fractions" distributors. It will be seen, therefore, that the sender conductors, each of which is connected to receive from the distributor segments the impulses corresponding to a certain digit or fraction and which were formerly connected through the set of "bid" keys 402 to the bus bar 416 and are now connected through the set of "asked" keys 403 to the same bus bar for the operation of the master sender relay 401 which will be hereinafter described.

Figure 6:
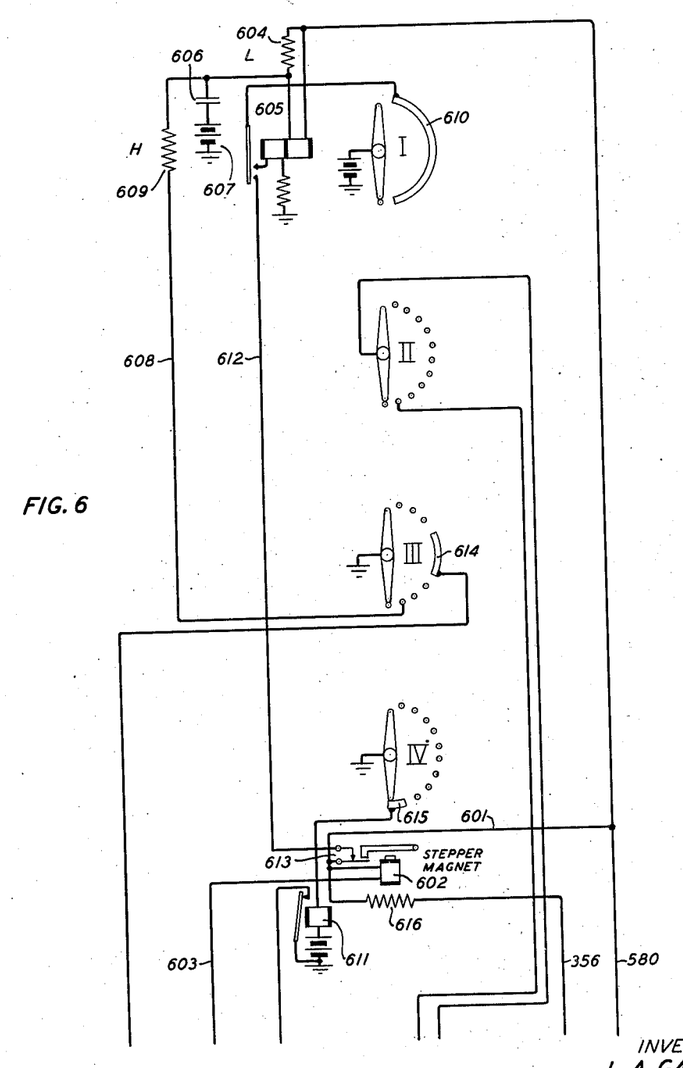
Fig. 6 shows a stepper switch circuit arrangement provided for each selecting mechanism such as shown in Fig. 3.

When relay 561 operated, it opened at its outer left armature and contact the locking circuit for relay 552 which then became deenergized so that after the next revolution of the "fractions" distributor representing a part of a "bid" quotation, the "space" distributor will operate. Also, relay 561, in operating connected grounded battery at its inner left armature and contact to conductor 575 which extends through the left-hand winding of relay 400 to ground at the left contact of "send" key 404, the operation of which will be hereinafter described. At the right armature and contact of relay 561 grounded battery is connected to the operating circuit for the rotary stepper switch shown in Fig. 6. Relay 561 is common to all the selecting mechanisms employed in the system, but the stepper switch is individual to the selector mechanism shown in Fig. 3, each selecting mechanism having its own stepper switch. The stepper switch comprises four contact banks respectively designated I, II, III and IV. In response to a "wait" impulse the operating circuit for the stepper switch shown in Fig. 6, is energized and may be traced from grounded battery, contact and right-hand armature of relay 561, conductors 580 and 601, through the winding of stepper magnet 602, conductor 603, to ground at the contact and right-hand armature of relay 301. The operating circuit for magnet 602 has a parallel path extending through the low resistance 604 and through the right-hand winding of relay 605 in parallel, through condenser 606 to ground and battery 607. The batteries at the opposite ends of this parallel path are of like polarity and therefore relay 605 and condenser 606 remain unaffected at this time. The stepper switch is substantially of the type described in United States Patent No. 1,791,587 granted to G. S. Vernam on February 10, 1931.

The operation of stepper magnet 602 causes wipers or brushes of the four banks to rotate one step. The first and second contacts of bank IV form a continuous segment 615 to hold, while the switch is in its normal and first operated position, relay 611, in an operated position for the purpose of maintaining a ground connection in the operating circuit for restore relay 319. The wiper of bank III, in its second position, connects ground to a circuit extending over conductor 608, high resistance 609, through condenser 606 to grounded battery 607. Condenser 606 at this time is slowly charged to the potential of battery 607. The wiper of bank II, in its second position, closes a circuit for completing the selected circuit prepared by the selecting mechanism, shown in Fig. 3, as will be hereinafter described.

The wiper of bank I, in its second position, connects grounded battery to segment 610 for preparing for magnet 602 a self-interrupting circuit which is completed when the switch moves into its third or "return to normal" position, as will be hereinafter described, the last-mentioned circuit being utilized in conjunction with segment 610 to set the switch to a normal position.

At the expiration of the "wait" impulse which has a duration of about one-half second, relay 561 releases and opens at its inner left armature and contact the operating circuit for relay 400, but the latter relay is maintained operated by its locking circuit extending from ground and battery, 450, through the right-hand winding of relay to ground at the contact and outer left-hand armature of relay 440. Also at this time a circuit is closed from ground, brush 571, segment 572, conductor 534 to operate the clutch release magnet 525, whereupon the "digits" distributor begins rotating to send the "bid" quotations of the various stocks. As hereinbefore stated, the "bid" quotations are followed by a "space" signal, the "asked" quotations and a "wait" impulse, in turn. At the second "wait" impulse received by magnet 602 the switch steps into its "return to normal" position wherein, at bank IV, ground is disconnected from the operating circuit of relay 611; at bank III, ground is disconnected from the charging circuit for condenser 606; at bank II, the selected circuit of the selecting mechanism previously closed by the switch in its second position, is opened; and at bank I, the self-interrupting circuit for magnet 602 begins operating to step the switch around to normal. The last-mentioned function is performed by means of the discharge of condenser 606 which at the time the second "wait" impulse occurs, a discharging circuit for condenser 606 is completed from positive battery 607, through the right-hand winding of relay 605, over conductor 580, right-hand armature and contact of relay 561 to positive battery. The discharge of condenser 606 operates relay 605 which locks up in a circuit extending through its left-hand winding, upper contact and armature of the relay, segment 610, and its associated wiper to grounded battery. The operation of relay 605 also completes the self-interrupting circuit which extends from grounded battery at bank I, segment 610, armature and lower contact of relay 605, conductor 612, contact 613, to the winding of magnet 602, conductor 603 to ground at the right-hand armature of relay 301. Relay 301 is maintained operated by the slow-release relay 205 which remains operated, after the cessation of quoted signal impulses, for a time sufficient to permit the switch to return to a normal position. The release of relay 611 effects the release of restore relay 319 which, in turn, causes the release of the selecting mechanism. During the time that the switch is returning to normal position, ground is connected at bank III to segment 614 to complete an operating circuit for release magnets 345, 346, 347, 348, etc., respectively provided for the selector switches 320, 307, 308, 309, etc. When the stepper switch of Fig. 6 reaches a normal position the selecting mechanism is again in a position to receive another incoming request. Therefore, only one quote can be obtained on one request and several quotes on the same stock or different stocks may be given during the same interval of time, providing, of course, that the requests are transmitted over different groups of selecting mechanisms. The interval in which a broker receives a quote depends upon the moment in the cycle of distributor operation at which the broker operates his "request" key 202, for example, each broker will receive his quote immediately following the second "wait" impulse after he has operated his "request" key. This result is accomplished by providing a rotary stepper switch, such as shown in Fig. 6, for each of the selecting mechanisms employed in the system. The rotary stepping switch arrangement is a desirable feature in that it prevents a broker from tying up the selecting mechanism which results in quick overall time and reduces the number of selecting mechanisms required in actual practice. A more detailed description of the function and release of the selecting mechanism will be given hereinafter.

*Operation of post key*

Each stock would have associated with it a total of seventy-two key contact sets at some one trading post on the floor of the exchange. Eight of these key contact sets are used for establishing a circuit to send a maximum of three whole digits or numbers and a fraction for each "bid" and each "asked" quotation. Keyset 402 serves to set up the "bid" quotation and keyset 403 serves to set up the "asked" quotation. There is also associated with these two sets the "send" key 404 and a change or "clear-out" key 405. All keys are of the locking type.

The operation of any one "bid" or "asked" key makes it possible for the sending of the character for which it is designated in the proper position, that is, the hundreds, tens, units or fractions place. As stated above, distributor ring set 500 sends the impulse combination corresponding to "0" twice during every revolution of its brush, to be selected for the tens and units places, distributor ring sets 501 to 509, respectively, send impulse combinations corresponding to the digits 1 to 9, three times during every revolution of their respective brushes, to be selected for the hundreds, tens and units places and distributor ring sets 510 to 516, respectively, send seven fractions varying in increments from ⅛ to ⅞ once during every revolution of their respective brushes, to be selected for the fractions place. The transmission of these impulses to the common bus bar 416 for any one stock is automatically controlled and alternately pass through the key sets 402 and 403 through the operation of transfer relays 406 to 415, inclusive.

Assume that the distributor system has been set into operation as hereinbefore described, and that the post keys of sets 402 and 403 representing the "bid" and "asked" quotations for a certain stock have been operated. The "send" key 404 is then operated. This key in combination with the "change", or "clear-out" key 405 is of the type which has a mechanical connecting device so arranged that the operation of one key releases the other. Furthermore, the operation of the "change" key releases all the operated "bid" and "asked" keys. Any suitable keyset arrangement having mechanically or electromagnetically locking means may be readily adapted for use with the present invention.

A preferred arrangement is disclosed in United States Patent No. 1,972,985 granted to L. A. Gardner on September 11, 1934. Operation of "send" key 404 connects ground to the operating or left-hand winding of relay 400 in a circuit which is prepared for operation only during the operation of the "wait" distributor when a "wait" impulse holds relay 561 in an operated position for approximately one-half second. Operation of "change" key 405 prepares an operating circuit for relay 440 through the right-hand winding of the relay and over the same circuit that extends from the left-hand winding of relay 400. On the next "wait" impulse when relay 561 operates and thereby closes a contact at its inner left armature, relay 440 operates. While the "change" key is operated, "send" key 404 is opened due to the mechanical connection and therefore relay 400 cannot close due to the removal of ground at the "send" key. In this manner no portion of a quotation can be transmitted to the line until another "wait" impulse is sent, which causes relay 400 to operate, providing, of course, that "send" key 404 has been operated in the interim.

Relay 400 in operating locks itself over its right-hand winding to ground at the outer left armature of relay 440, which is released when a change in post key is made and the "send" key 404 is operated. The operation of relay 400 closes a circuit from the operated post key and the associated bus bar 416 to the master sender relay 401 which controls the operation of a plurality of sender relays, hereinafter described, which are adapted to transmit the quotations on one stock to a plurality of brokers' offices. From this description it will be seen that a post operator, that is, an attendant at a trading post, could operate the "send" key 404 and then change the set-up for another stock on another pair of keysets (not shown) without waiting for the "wait" distributor to operate. When a change in either or both "bid" and "ask" quotations is to be made, the post operator presses the "change" key 405, and as stated before, prepares a circuit through the right-hand winding of relay 440 which will be operated on the next "wait" impulse, that is, after the completion of the quotation for which the post keys are arranged or operated. The operation of relay 440 causes the operation of relays 417 and 418 which effect the release of the latches which hold the operated post key in operated position. The release of these latches may be effected by any of the suitable means well known in the art. Relays 417 and 418 may be considered as corresponding to relay E shown in Fig. 2 of United States Patent No. 1,972,985, supra. Red lamp 419 associated with each pair of keysets indicates to the operator that the post keys are released and a new set-up can be made.

From the above description it will be seen that operation of the "change" key 405 and the "send" key 404 will not interfere with the keysets 402 and 403 during the transmission of a quotation and also that it will not be necessary for the post operator to wait for the impulse from the "wait" distributor before operating the "send" and "change" keys. The alternate functions to be performed by the "change" and "send" keys will be attained automatically, the keys merely preparing a circuit which will be completed on the next impulse from the "wait" distributor. This feature makes it possible for a post operator to handle a larger number of stocks.

*Operation of broker's equipment and selecting mechanism*

Now that a clear understanding is had of the operation of the common sender and the post keys, which operations are entirely independent of the operation of the equipment at the broker's office and the selecting mechanism at the exchange, a description of the broker's equipment and the selecting mechanism will now be given.

The purpose of the selecting mechanism is to provide a means whereby an operator in a broker's office equipped with a sending and receiving printer may type the symbols of a desired stock, operate a "request" key and then be automatically connected to a transmitting point, which is continuously quoting the requested stock information. The quotations will then be received and printed on the broker's typewriter tape immediately following the stock symbols which were transmitted to the exchange. This is accomplished by having the receiving and the transmitting units of the printer set at the broker's office connected in series as is customary, with the transmission line. The printed record will therefore resemble the customary ticker tape and the prices will be "bid and asked" quotations. The selecting mechanism to be described herein may also be applied to a telegraph typewriter automatic switching system, such as disclosed in United States Patent No. 1,637,324 granted to D. B. Perry on July 26, 1927. The selecting mechanism may be substituted in place of the connector switch designated 200 in United States Patent No. 1,637,324.

After the line finder has selected the calling line a closed circuit exists from the sending and receiving printer 201 in the broker's office 200, over conductors 204 and 208, outer left armature and contact of request relay 206, conductor 207, line 102, upper level 209' of line finder 209, conductor 102', armature and back contact of transfer relay 301 to the "receiving only" printer or mechanism 300 to ground. The typing at the broker's printer 201 of each letter of a combination of symbols which represents a certain stock, will result in the operation at the "receiving only" printer 300 of the corresponding pull bar, such as 302, 303, 304, etc., which corresponds to the pull bar 701 shown in Fig. 7. These symbol combinations may consist of one or more letters, such as A, B, C, etc., AB, BA, AC, etc., utilizing if desired, the entire twenty-six letters of the alphabet. Each combination will represent a certain stock. Typing of each letter will cause a single momentary operation of stepper relay 305 over a circuit which may be traced from grounded battery 306, through the winding of relay 305, a set of contacts closed by a pull bar, such as 302, 303, 304, etc., depending on which letter is selected, a rotatable wiper on the selector switch such as 307, 308, 309, etc., which is associated with the operated pull bar, through the right-hand winding of a selecting relay, such as 310, 311, 312, 313, 314, 315, 316, 317, 318, etc., to ground at the armature and contact of the selecting mechanism restore relay 319. Should the stock symbol combinations consist of one letter only, the first selected relay of a group controlled by the selector switch which is associated with the pull bar actuated by the single letter will be operated; should there be two letters in the combination the first two selected relays of one group or the first relay in one group and the second relay in another group will be operated and should there be three letters in the combination, the first three selecting relays in one group, or the first two in one group and the second in another group, or the first in one group, the second in another group and the third in still another group will be operated. This result is obtained by the operation of stepper relay 305 in stepping the switches 307, 308, 309, etc., one step for each letter transmitted to printer 300 which effects the operation of the corresponding pull bars.

Associated with selector switches 307, 308, 309, etc., is a common rotary switch 320, also responsive to the operation of stepper relay 305, the stepping operation being produced by the momentary operation of relay 305 over a circuit extending from grounded battery 306, armature and contact of relay 305, through the windings in parallel, of rotary magnets 329, 330, 331, 332, to ground. Rotary switches 320, 307, 308, 309, etc., are of the type which have two magnets, one, such as magnets 329, 330, etc., for respectively rotating the wipers, or brushes, to make a selection, and the other, such as magnets 345, 346, etc., for respectively releasing the wipers to restore them to normal, the releasing arrangement (not shown) being self-interrupting in operation as well known in the art. Switch 320 normally rests in its first position (as shown) which is open, but in response to the first operation of relay 305, moves into a second position wherein a circuit is prepared through the winding of control relay 321. Should relay 305 operate a second time in response to a second letter of the stock code, as for a two-symbol combination, switch 320 will move into its third position thereby disconnecting the winding of relay 231 and preparing a circuit through the windings, in parallel, of control relays 322, 323, 324, etc. Each of the selecting relays selected by the joint operation of its associated pull bar and selector switch locks itself in a circuit extending from grounded battery 328, through the armature and left-hand winding of the relay, to ground at the armature of restore relay 319.

Imediately after sending the last letter of a symbol combination, whether it be one or two letters, the operator at the broker's office presses a non-locking "request" key 202 which connects ground to the right-hand winding of the request relay 206. Relay 206 operates and locks itself in a circuit extending from ground and battery through its left-hand winding, inner left armature and contact, armature and back contact of slow-release relay 205, to ground. The operation of relay 206 removes, at the outer left armature and contact of the relay, the shunt path around relay 205, so that the latter relay is now in the line circuit. Also, at the right armature of relay 206, a circuit is closed extending from grounded battery 210, white lamp 211, lower level 209″ of line finder 209, auxiliary line 203, through the winding of transfer relay 301, to ground. Relay 301 operates and transfers the conductor 102′ from printer 300 to conductor 102″. The circuit completed at the right armature of relay 206 extends also over the wiper of switch 320 and completes a path through the winding of either control relay 321, 322, or 325 to ground, it being understood that the path through the winding of relay 322 also extends through the windings of relays 323, 324, etc., in parallel, and the path through the winding of relay 325 also extends through the windings, in parallel, of relays 326, 327, etc. The determination as to which control relay, or group of control relays is operated depends, of course, on the final position of the wiper on switch 320 after the symbol combination of a certain stock is transmitted. The lamp 211 which is included in the above described request circuit, lights to indicate that relay 206 has operated and that the request circuit to the selecting mechanism is continuous.

Should the symbol combination consist of one letter only, one of the selector-connector relays 333, 334 and 335, etc., would be operated after the next "wait" impulse following the operation of "request" key 202, the operation being effected by a circuit including battery 336 enclosed by the joint operation of relay 321, which is connected to the second contact of switch 320, and the selecting relay connected to the first contact of one of the switches 307, 308, 309, etc., the selecting relay operated being the one which is associated with the pull bar that is operated in response to the certain transmitted letter. Should the symbol combination consist of two letters, one of the connector relays 337, 338, 339, etc., would be operated, after the next "wait" impulse following the operation of the "request" key, the operation being effected by a circuit including battery 336 and closed by the joint operation of one of the control relays 322, 323, or 324, etc., which is connected to the third contact of switch 320, and two selecting relays which are respectively connected to the first and second contacts of the same switch or different switches, for example, a combination of AA would cause the operation of relays 310 and 311, which are respectively connected to the first and second contacts of switch 307 and a combination of BA would cause the operation of relay 313 which is connected to the first contact of switch 308 and relay 311 which is connected to the second contact of switch 307. Should the symbol combination consist of three letters, one of the connector relays 340, 341, 342, etc., would be operated from battery 336, after the next "wait" impulse following the operation of the "request" key, through the joint operation of one of the control keys 325, 326, 327, etc., which is connected to the fourth contact of switch 320 and three selecting relays which are respectively connected to the first, second and third contacts of the same switch or different switches. For example, the combination of BBA would cause the operation of selecting relays 313 and 314 which are respectively connected to the first and second contacts of selector switch 308 and selecting relay 312 which is connected to the third contact of selector switch 307. Consequently, the conductor 102″ would be connected over the armature and contact of the connector relay 341 which was selected for operation by the symbol combination BBA transmitted from the broker's office.

Assuming that connector switch 341 was selected for operation, then conductor 102″ will be extended over the right-hand armature and contact of relay 341, conductor 343 to one of the contacts of a connector switch of the rotary stepper of the hunting type. This switch is comprised of ten switching banks such as those designated 420 to 429, ten switching banks being required for each active stock listed in the exchange. Each switching bank comprises two levels. The total number of switching banks required will depend on several factors, such as the number of selecting mechanisms (Fig. 3) employed; and the number of active stocks listed. It is estimated that for one thousand brokerage offices, the traffic of the New York Stock Exchange will require about one hundred selecting mechanisms and therefore each selecting mechanism will be accessible to ten brokerage offices as will be provided for by means of a line-finder switch such as that designated 209 shown in Fig. 2. In order to handle traffic several brokerage offices, connected to different selecting mechanisms which desire information of any certain stock simultaneously, the selecting mechanism can be distributed in their connection to the contact of ten different switching banks assigned to the particular stock, there being ten selecting mechanisms respectively connected to the contacts of each bank, or in other words the one hundred selecting mechanisms are arranged in ten groups of ten each. Each of the banks for each stock have access to its wipers which rotate thereover continuously except when stopped in response to an incoming request to a sender relay which continuously repeats the desired information during regularly timed recurring "intervals". Two or more brokerage offices connected over different connector switches may be simultaneously connected to two or more sender relays respectively assigned to one stop. This is made possible by maintaining the quote circuit individual to wipers on the upper levels of the ten switching banks respectively connected to the ten groups of selecting mechanisms.

In Fig. 4 the contacts shown in the upper banks of switching banks 420 to 429, inclusive, are assumed to be respectively connected to the one hundred selecting mechanisms provided through the connector relays assigned to any one stock, for example the fifth contact of level 420 is connected to the selecting mechanism shown in Fig. 3 through the connector relay 341 which is designated as being assigned to stock BBA, and the remaining contacts shown will be connected to the corresponding relay in each of the other selecting mechanisms not shown.

Each stock has associated with itself ten sender relays 430 to 439 connected in series and arranged to be controlled by the master sender relay 401. These sender relays respond to impulses received from the common sender shown in Fig. 5. A switch bank such as any one of those designated 420 to 429 is provided for each sender relay and the one hundred selecting mechanisms will be arranged in ten groups which are respectively connected to ten switching banks for each stock so that every group of brokerage offices will have access to a sender relay for each stock.

Each switching bank comprises two levels normally maintained in continuous operation but controlled from different groups of selecting mechanisms. These levels are referred to herein as the quote, or upper, level and the operating, or lower, level, the wipers of the two levels of any one bank being in the same position at all times. Normally the wipers of each bank are rotated, the energizing circuit for bank 420 being traceable from grounded positive battery through the right-hand armature, contact and winding of magnet $a''$, wiper $a'$, any one of the contacts of the lower levels and the conductor connected thereto such as conductor 349, to the left-hand armature and back contact of a BBA connector relay, such as relay 341 of one of the selecting mechanisms over a conductor 350 common to the connector relay of one selecting mechanism to the negative pole of battery 351 which has a mid-tap to ground. This circuit has positive and negative battery respectively connected to opposite ends whereby magnet $a''$ operates and the circuit being of the self-interrupting type causes the wiper $a$ and $a'$ of bank 420 to step around in continuous rotation. Each bank is operated in a similar manner with its wipers always being in the corresponding positions, although the wipers of one bank may be in a different position from those of any other bank.

As soon as a connector relay is operated, for example, relay 341, its left-hand armature closes a circuit from the positive pole of battery 351, conductor 352, front contact and left armature of relay 341, conductor 349, to the fifth contact of the operating level of level 420, wiper $a'$ through the winding, contact and armature of magnet $a''$ to positive battery. This circuit having a positive battery at opposite ends, stops wiper $a'$ on the fifth contact. Likewise, wiper $a$ of the quote level is stopped on the fifth contact. When relay 341 operated, the quote circuit including conductors 102, 102' and 102″ was closed at the right-hand armature and contact of the relay and now the circuit extends over conductor 343, the fifth contact and wiper $a$ of bank 420, conductor 441, contact and armature of sender relay 430, conductor 460, armature and contact of holding relay 354 to ground. Relay 354 was operated simultaneously with the connector relay such as 341. The quote circuit is now prepared to receive the desired information repeated by sender relay 430 in recurring cycles. At the completion of the quote the sender relays 430 to 439 are held operated by the master sender relay 401, which is in turn held operated by the "wait" impulse, thereby removing ground from the quote circuit to effect the release of the apparatus at the brokerage office as is hereinbefore described.

The circuit referred to above as the quote circuit, and over which the quote of some stock such as BBA is transmitted and extends over conductors 102″ and 102', upper level 209' of the line finder 209, line 102, through the winding of relay 205 to grounded battery at printer 201. Relay 205 operates to insert over its left armature and front contact resistance 212 in the locking circuit for relay 206 and to complete at its right armature an operating circuit for a red lamp 213 which indicates that the circuit is connected to a sender relay and that a quotation is about to be received. While the left armature of relay 205 is in engagement with the front contact, the current through the locking winding of relay 206 would be reduced by resistance 212 to a value just sufficient to hold relay 206 operated. Removal of this reduced current will allow relay 206 to deenergize, whereas the current through ground over the back contact and left-hand armature of relay 205 will be sufficiently large to maintain relay 206 energized during the transfer of an armature of relay 205 from its back contact to its front contact. During the sending of impulses for selection purposes the relay 205 is shunted by the outer left-hand set of contacts of relay 206 and therefore cannot respond to the outgoing signals.

At the completion of the first "wait" impulse after the operation of the "request" key 202, the impulses corresponding to the "bid" and "asked" quotations are repeated by master relay 401 through the sender relays 430 to 439. Relay 430 repeats the impulses to the broker's office 200 where they are received in the printer 201 and printed on the tape adjacent to the letters representing the "request" stop. Relay 205 being of the slow-release type is not affected by the signal impulses and consequently remain operated until the next "wait" impulse, that is the second "wait" impulse after "request" key 202 has been operated, is received, at which time it becomes deenergized due to the prolonged opening of the circuit at sender relay 430.

During the first "wait" impulse after the operation of the "request" key 202, the pulse operator might want to change the selection in keysets 402 and 403. This could be done by operating change key 405 while relay 561 is operated, thereby closing the circuit extending from grounded battery, inner left armature and contact of relay 561, conductor 575, through the right-hand winding of relay 440 to ground at the operated key 405. Relay 440 would operate and lock up over its left-hand winding and left front contact to ground at the normal contact of "send" key 404. The operation of relay 440 would open the locking circuit for relay 400 which would release and in turn cause the release of master sender relay 401. The release of relay 401 would release the sender relays 430 to 439 and the armatures and back contacts of the sender relays would thereby hold the quote line closed until such time as the operator has completed changing the selection in keysets 402 and 403 and has operated "send" key 404. During the "wait" impulse immediately following the operation of the "send" key 404, relay 400 operates over its left-hand winding and locks up over its right-hand winding so that now the master sender relay 401 and sender relays 430 to 439, inclusive, respond to the impulses constituting the new quotation. In the interim that the key selection was being changed, the selector switch shown in Fig. 6 has moved into its second position wherein the connector relay 341 has operated in response to symbol combination BBA and the switch bank 420 has moved its wipers into engagement with their fifth contacts. The operation of the change key 405 during a "wait" impulse holds relays 400 and 401 in released position until the send key 404 is operated. The release of relay 401 allows the armatures of the sender relays 430 to 439 to stand against their back contacts for a prolonged period that is longer than one-half second. The circuit closed by sender relay 430 extends from grounded battery at printer 201, conductor 204, through the winding of relay 205, conductor 102, line finder switch 209, conductor 102', armature and front contact of relay 301, conductor 102", through the winding of relay 355, right-hand armature and contact of relay 341, conductor 343, fifth contact and wiper of the upper level of switching bank 420, conductor 441, armature and contact of sender relay 430, conductor 460, to ground at the armature of relay 354. Relay 355 is of the slow operating type which operates in a circuit which is held steadily closed for a period exceeding a half second, and also does not remain operated on the signal impulses of the quotation. During the comparatively long period in which "change" key 405 may be operated, relay 355 operates and connects ground at its armature and contact to a circuit extending over conductor 356, through a resistance 616 to conductor 601. The resistance 616 is made approximately equal to that of the winding of magnet 602 so that the latter circuit forms a shunt path equal and parallel to the path extending through the winding of magnet 602. Magnet 602 will not operate in response to a "wait" impulse as long as relay 355 is operated and therefore the sender switch shown in Fig. 6 will remain in its second position until the "change" key 405 is released by the operation of the "send" key 404. Immediately following the next "wait" impulse after the "send" key is operated, the sender relays 430 to 439 begin responding to the impulses of the "bid" and "asked" quotations at which time relay 355 releases and opens the shunt path around magnet 602. However, the stepper switch remains in the second position until the next "wait" impulses and therefore is in a position whereby the quotation of the new key setting may be transmitted to the broker. In this way a broker who makes a request for information on a certain stock at a time when the quotation is being changed, the connection will be maintained until the change is completed and he will receive the latest information. The second "wait" impulse transmitted by a ring set 518 after the "request" key 202 has been operated, or the next "wait" impulse after the broker has received the desired information, restores the selecting mechanism such as shown in Fig. 3. The restoration of the selecting mechanism and the broker's operated apparatus is effected in the following manner. The operation of relay 561 in response to the "wait" impulse immediately following the transmission of the desired information to the broker closes the operating circuit for magnet 602 which operates and sets the switch of Fig. 6 from its second position through its third position and immediately on to normal. At this time the condenser 606 discharges through the right-hand winding of relay 605 which now operates and completes another but self-interrupting operating circuit for magnet 602 which circuit is traceable from grounded battery at the wiper of bank I, segment 610, armature and lower contact of relay 605, conductor 612, contact 613, through the winding of relay 602, conductor 603, contact and right-hand armature of relay 301 to ground. This circuit due to segment 610 trips to ground. This circuit due to segment 610 trips the switch to its alternate normal position. The wiper on bank II stepping out of its second position opens the selected circuits which were prepared by the selecting and control relays and closed at bank II when the wiper steps into its second position. The wiper of bank III stepping out of its second position opens a charging circuit of condenser 606 and in passing over segment 614 closes an operating circuit for release magnet 345, 346, 347, 348, etc., whereby the switches 320, 307, 308, 309, etc., are stepped around to their normal positions. The wiper of bank IV in stepping out of its second position opens the operating circuit for relay 611 which releases and opens the operating circuit for restore relay 319. The latter relay releases and opens the locking circuit for the selecting relays which have now released. The operating circuit for the control relay is opened when selector 320 returns to normal due to operation of release magnet 345 from bank 3, immediately after the information is furnished and that of the stock relay BBA, for example, is opened at switch bank II. The release of the stock relay effects the release of the connector switch relay, but the connector switch stepping magnet has an operating circuit closed at the back contact of the stock relay and the switch continues its rotation until selected by another request. Cessation of signal impulses through relay 205 deenergizes the relay and the movement of the left-hand armature from the front contact to the back contact effects the release of relay 206 due to the reduced current flowing in the relay winding, thereby restoring the circuit for lamps 211, 213 and the transfer relay 301 to normal. The system theoretically provides for one selecting mechanism which is shown in Fig. 3 for every broker subscriber to this class of service. However, such an arrangement is impracticable because of the great amount of apparatus that would be required and the space which would be necessary to install it. It is estimated therefore, as stated above, that for every one thousand brokers about one hundred selecting mechanisms will be required to meet the traffic requirements. Therefore each selecting mechanism will be accessible to line circuits extending from ten brokers' offices by employing a line-finder switch 209.

*Operation of the system*

For the purpose of illustration, a simple connection will be established by assuming that the operator at the broker's office 200 desires the latest "bid" and "asked" quotations for a stock having a symbol BBA. The operator presses in the order mentioned the "B" key twice and the "A" key once on the keyboard at printer telegraph typewriter 201 and the letters BBA are printed on the tape thereat. The corresponding impulses of each letter in turn are successively transmitted over the circuit traceable to grounded battery at printer 201, conductors 204 and 208, outer left armature and contact of relay 206, conductor 207, line circuit 102, line-finder 209', conductor 102', armature and back contact of relay 301, "receiving only" printer 300 to ground. The impulses for the first letter "B" selects and actuates a corresponding type bar which in turn operates pull bar 303. The pull bar momentarily closes at its associated contact an operating circuit traceable from grounded battery 306, through the winding of a stepper relay 305, closed contact of pull bar 303, wiper and selector switch 308 at its first or uppermost contact through the right-hand winding of relay 313, armature and contact of restore relay 319 to ground. Relay 313 operates and locks itself over its left-hand winding in a circuit extending from grounded battery 328, armature, contact and left-hand winding of relay 313, armature and contact of relay 319 to ground. In the operating circuit just traced, stepper relay 305 operates and closes operating circuits for each of the rotary selector switch magnets 329, 330, 331, 332, etc., which operate simultaneously to move the wipers on switch 320, 307, 308, 309, etc., one step to the second contact. The impulses of the second letter "B" select and actuate the same pull bar. The pull bar again momentarily closes its associated contacts and an operating circuit is closed from grounded battery 306 through the winding of relay 305, closed contacts and pull bar 303, wiper and second contact of switch 308, through the right-hand winding of relay 314, armature and contact of relay 319 to ground. Relay 314 operates and locks itself over its left-hand winding. The operation of relay 305 again causes the switch wipers to be actuated to the next or third contacts. The impulses of the third letter "A" select and actuate the pull bar corresponding to letter "A" and pull bar 302 is moved upward to close the associated contacts, whereby a circuit is closed traceable from battery 306, through the winding of relay 305, closed contacts of pull bar 302, wiper and the third contact of switch 307, through the right-hand winding of relay 312, armature and contact of relay 319, to ground. Relay 312 operates and locks itself over its left-hand winding. Relay 305 also operates, but momentarily, to cause the switch wipers to move to the fourth, or lowermost, contacts. Relays 313, 314 and 312 are now operated.

The operator at printer 201 presses "request" key 202 which connects grounded battery to the right-hand winding of relay 206. Relay 206 operates and closes parallel operating circuits for the transfer of relay 301 and control relays 325, 326, 327, etc., the control relays being operated in a circuit which are completed over the fourth or lowermost contacts of switch 320 and relay 301 and effecting the transfer of conductor 102' from the printer 300 to conductor 102''. The white lamp 211 lights in the above circuit to indicate that the "request" circuit is completed through the selecting mechanism shown in Fig. 3. Relay 206 in operating closes a locking circuit for itself over its inner left armature and front contact, left armature and back contact of relay 205 to ground. Relay 205 opens at its outer left armature and contact the shunt path around the winding of relay 205 which now becomes connected to the line circuit.

With the relays 313, 314, 312 and 325 in operated position, a circuit is prepared extending from the positive side of battery 336, a contact and armature No. 2 of relay 313, through the winding of relay 341, contact and armature No. 3 of relay 314, then extending over the contact and armature of relay 325, armature and contact No. 1 of relay 312, armature and contact No. 1 of relay 314, armature and contact No. 1 of relay 313, through the wiper of bank No. II in the second position, back to the negative side of battery 366. Relay 341 which corresponds to the symbol combination of BBA which represents the stock of which the latest "bid and asked" quotation is desired, does not operate until a "wait" impulse is transmitted by the sender shown in Fig. 5 immediately after closing "request" key. The "wait" impulse immediately following the operation of the "request" key steps the switch shown in Fig. 6 to its second position wherein the selected circuit is completed.

The operation of stock relay 341 connects at its left armature and front contact the positive pole of battery 351 to the circuit extending over conductor 349, the fifth contact of the lower back of connector switch 420, wiper $a'$ through the winding of rotary stepper magnet $a''$ to positive battery at the right-hand armature of the magnet. The wiper $a'$ finding positive battery on the fifth contact stops immediately because the current in the self-interrupting circuit of magnet $a''$ becomes zero due to its like polarities on opposite ends of the operating circuit. Wipers $a$ and $a'$ are mounted on the one shaft in the same relative positions and therefore $a$ will also stop on its fifth contact. The quote circuit is now connected over the right armature and contact of relay 341, conductor 343, wiper $a$, conductor 441, contact and outer contact and armature of relay 431, conductor 460, to ground at the armature of relay 354.

Assuming that the stock operator at the trading post, at which the desired stock BBA is handled, has set up on the keysets assigned to the BBA stock quotations, 310⅛ bid and 313⅞ asked. Keys operated in set 402 are H—3, T—1, U—0 and F—⅛ and the keys operated in set 403 are H—3, T—1, U—3 and F—⅞. Also let it be assumed that the non-locking start key 533 has been actuated, the common sender is in operation and the key transfer relays 416 to 445, inclusive, are in the position shown. At the completion of setting up quotations on the keysets 402 and 403, the operator presses a locking "send" key 404. During the next operation of the "wait" distributor, a "wait" impulse having a duration of about one-half second which is long in comparison to the duration of the signal impulses transmitted by the digits, fractions and "space" distributors, is sent over a circuit extending from battery 567, ring set 518, conductor 569, through the winding of relay 561, conductor 560, outer left armature and contact of relay 400 to ground. Relay 561 operates to connect battery at its inner left armature and contact in a circuit extending over conductor 575 through the left-hand winding of relay 400 to ground at the "send" key 404. Relay 400 operates and locks whereby it disconnects from ground at its outer left armature and contact and connects at its inner left armature and contact the connector of bus-bar 416, through the winding of master sender relay 401 to ground. At the end of the "wait" impulse, the digit distributor begins operating as described above. Relay 401 then responds to the impulses received from the first or hundreds section of ring set 503, over conductor 581, the uppermost armature and upper contact of relay 409, closed contacts of key H—3, bus-bar 416, inner left armature and contact of relay 400, through the winding of relay 401 to ground. Relay 401 responds to the impulses received from the "hundreds" section of ring set 503 and repeats them to a plurality of sender relays 430 to 439, connected in series. The next group of impulses are transmitted by the middle or "tens" section of ring set 501 over conductor 582, the middle armature and upper contact of relay 407, closed contacts of key T—1, bus-bar 416, inner left armature and contact of relay 400, through the winding of relay 401 to ground. Relay 401 repeats these impulses to the sender relays 430 to 439. The third group of impulses are transmitted by the last or "units" section of ring set 500, over conductor 583, lower armature and upper contact of relay 406, through the closed contacts of key U—0, bus-bar 416, inner left armature and contact of relay 400, through the winding of relay 401 to ground. Relay 401 then successively repeats these three groups of impulses to the sender relays. After the digit distributor completes one revolution, the fraction distributors start operating and a group of impulses is transmitted from ring 510 over conductor 584, lowermost armature and upper contact of relay 409, to the closed contacts of key F—⅛, bus-bar 416 to be repeated to the sender relays by the master relay 401.

At the completion of one revolution of the fraction distributors, the space distributor is operated as hereinbefore described to provide a space between the "bid" and "asked" quotations. Also the space distributor effects the operation of transfer relays 406 to 415, inclusive, so that the next transmission of impulses from the digit and fractions distributors will pass over the relay armatures and their respectively associated lower contacts and then through the operating keys of keyset 403. When the space distributor completes one revolution, the operation of the sender is again shifted to the digits and fractions distributors in turn, the "hundreds" section of ring set 503 transmitting through the closed contacts of key H—3, "tens" section of ring set 501 transmitting through the closed contact T—1, the units section of ring set 503 transmitting through the closed contacts of key Q—3 and the ring set 516 of the fraction distributor transmitting to the closed contacts of key F—⅞, it being understood that these three keys are in keyset 403.

At the end of each interval wherein a complete "bid" and "asked" quotation is transmitted, a "wait" impulse is transmitted to operate relay 561 which in turn causes the operation of rotary magnet 602 providing of course that the "change" key 405 is not in an operated position at the time. The first "wait" impulse occurring immediately after the "request" key 202 is operated, causes the switch shown in Fig. 6 to move one step and during the next quote interval this switch remains stationary. At the second "wait" impulse, the switch steps into its third position wherein the continuous stepping operation is started to restore the switch to its alternate normal position. During the time the wipers are passing through 180 degrees, relay 611 becomes de-energized and relay 319 releases thereby releasing the operated apparatus in the selecting mechanism and at the broker's office. Relay 319, however, is immediately operated again due to the opposite ends of the wiper of bank IV reestablishing its grounded connection for operating relay 611 making the previously released selecting mechanism available for another call. The rotary line finder 209, the rotary selector switches 320, 307, 309, etc., and the rotary hunting switches 420, 421, 422, etc., will be returned to normal as is customary in this type of switch on a disconnection, the normal position of the hunting switches being one of continuous rotation. The sender mechanism shown in Fig. 5 will of course continue to operate and send out the same quotations unless changed by the operator at the post, and the relays 401, 430 to 439 will continue to function as long as key 404 remains operated. Therefore the quotation will be available electrically at the armature of the sender relay 430 to 439. In the event that two brokers attempt to get the latest information on a certain stock at the same time the lines of these brokers are connected over different selecting mechanisms which selecting mechanisms terminate on one connecting switch, as for example, switch bank 420, the broker's line which is connected through the selecting mechanism terminating on a contact that is in a position to be seized first by the wiper $a'$ will have the preference of getting the desired information. In order to avoid releasing both broker's lines after the first broker has received the information, a relay such as that designated 357 in the selecting mechanism engaged by the second broker is energized in a leak path to ground through a high resistance 358 and over conductor 102″, to battery at printer 201. Relay 357 operates in response to the operation of relay 301 and because no ground can be obtained at the sender relay associated with switching bank 420 which is now engaged by the first broker's line and the operation of relay 357 connects ground to a circuit extending over the armature and contact of relay 357, conductors 355 and 356, resistance 616, to conductor 601 whereby a shunt path around stepper magnet 602 is completed to prevent the operation of the stepper magnet 602 in response to the next "wait" impulse. This also prevents the release of the second broker's selecting mechanism during the time that the first broker is receiving his information. When a wiper a engages the contact connected through to the second broker, which will be during the interval of the second "wait", or "release", impulse for the first broker's line, relay 357 releases. The release of relay 357 opens the shunt path around magnet 602 and the latter responds to the next, or third, "wait" impulse after the operation of the "request" key at the second broker's office, whereby the selecting mechanism and apparatus connected with the second broker's line is released. In this way a broker's request for the same stock which is made simultaneously with another broker's request over the same group of selecting mechanisms is maintained until the other broker's request is answered there being no need of repeating the request.

What is claimed is:

1. A signaling system comprising a central station, a continuously actuated signal transmitting device at said central station having a source of potential, a plurality of elements each arranged to transmit from said source a permutation code combination of signaling impulses at regular intervals in each cycle of actuation, means for arbitrarily selecting one or more of said elements, groups of means for repeating at regular intervals the permutation code combination selected by said arbitrarily selecting means, remote stations, transmitting means and receiving means and a source of potential therefor at each of said remote stations for transmitting and receiving permutation code combinations of signaling impulses, a communication circuit interconnecting a repeating means of each of said groups and a receiving means at each of said remote stations, a plurality of contacts selectively engageable in response to permutation code combinations of signaling impulses received from a transmitting means at one of said remote stations for establishing a connection in said communication circuit, normally rotating means for seizing the selected contacts of said plurality to connect one of said repeating means directly to said communication circuit, and other means at said remote station operable to complete the communication circuit between said one repeating means and the receiving means at said remote station.

2. A signaling system, according to claim 1, wherein the means for selecting the elements comprise a plurality of circuits arranged in groups and extending between said elements and said groups of repeating means, groups of keys, each of said groups being arranged to control certain circuits of said plurality extending to a corresponding group of said repeating means, and means cooperating with said normally rotating means for connecting one of the repeating means of said corresponding group directly to said communication circuit.

3. In a system for the transmission of information, a main office, devices at said main office for repeating information, actuating means for causing the repeating devices to transmit electrical currents characteristic of the information, a plurality of remote stations arranged in groups, a plurality of line circuits respectively extending from said remote station to the central office, a transmitting device and a receiving printer associated together at each of said plurality of remote stations, a selecting mechanism common to each group of remote stations and comprising a plurality of selective circuits each of which is responsive to a different permutation code of current impulses transmitted thereto from any one of said transmitting devices, a plurality of normally rotating selective circuit finder switches, each of which has access to a plurality of selecting mechanisms and each of which is arranged to connect one of said repeating devices directly to one of said line circuits in response to the selective circuit operated by a permutation code of impulses transmitted from the transmitting device over said line circuit whereby the information being repeated by the selected repeater device is transmitted back to the associated receiving printer device over said one of said line circuits.

4. In a system for the transmission of information, in accordance with claim 3, wherein the actuating device comprises a timing element for preventing interference of the transmitting device of one of said remote stations in one group desiring certain information with the receiving device of another of said remote stations in another group when receiving information at the same time from said repeating device.

5. In a system for the transmission of information, a main office, a plurality of repeating devices at said main office for repeating information of a changeable nature, the information being repeated by each device being different from that being repeated by the other devices, a continuously actuated device at said main office for causing one or more of said repeating devices, whenever desired, to transmit electrical impulses characteristic of the information, a plurality of stations remote from said repeating devices and arranged in groups, circuits connecting the remote stations to said main office, telegraph means comprising a transmission device and a printer device associated together at each of said plurality of stations, both of said devices at each of said stations being connected to one of said circuits, a plurality of selecting mechanisms at said main office respectively associated with said groups of remote stations, a receiving device at said main office for each selecting mechanism, each of said receiving devices being responsive to impulses received from any one of said transmission devices at a group of said remote stations for operating its associated selecting mechanism to select any one of said repeating devices, and normally rotating means responsive to the simultaneous operation of a plurality of said selecting mechanisms for directly interconnecting said circuits and any one of said repeating devices whereby the desired information is transmitted successively over said circuits in the event that a plurality of transmission devices are simultaneously connected to the same repeating device.

6. In a system for the transmission of information, in accordance with claim 5, wherein said continuously actuated device has associated therewith independent of said normally rotating means selective locking devices for changing the information in any one of said repeating devices, a switching mechanism for determining the time at which the desired information shall be transmitted to said printer device, and a rotatable element operating in conjunction with said switching mechanism for delaying the transmission of such information in the event that it is desired to change the information during an interval when such information would ordinarily be transmitted.

7. In a telegraph system, a transmission circuit, a receiving printer device comprising contact members respectively responsive to telegraphic signals received from said circuit, a plurality of devices for repeating information of a changeable nature, a plurality of locking keys arranged to be changed and locked at any time to permit a change in the information to be repeated by said devices, a plurality of normally rotating means, each of which is arranged to select and connect one of said receiving means directly to said transmission circuit, a selecting mechanism comprising a plurality of locking devices responsive to the operation of said contact members for locking one of said normally rotating means in a stationary position, and means electrically operated for locking one or more of said locking devices in response to the operation of one or more of said contact members until the information on said selected repeating device is transmitted to said transmission circuit.

8. In a telegraph system, a plurality of transmission circuits arranged in groups, a plurality of receiving-only printers each comprising contact members respectively responsive to telegraphic signals received in any one of a group of said circuits, a plurality of devices for repeating information of a changeable nature, a common source for furnishing information to all of said repeating devices, a plurality of manually operated devices for selecting any desired information from said source and transmitting it to any one of said devices, said selecting device being arranged to determine the duration of the interval in which the desired information is repeated by said repeating device, a plurality of selecting mechanisms respectively associated with said groups of circuits, each of said mechanisms being responsive to the contact members operated by signal combinations received from one of said transmission circuits, and normally rotating means for operatively connecting one or more of said circuits by means of their respectively associated selecting mechanisms directly with a plurality of said repeating devices to simultaneously receive the information being repeated thereby.

9. In a telegraph system, a plurality of transmission circuits arranged in groups, a device in each of said circuits for transmitting telegraphic signals constituting a request for certain information, a plurality of receiving devices each comprising electrical contact members respectively responsive to the telegraphic signals received from any one of said groups of circuits, a plurality of repeating devices, a plurality of manually operated devices arranged to change the information to be repeated by said repeating devices, a plurality of selecting mechanisms respectively associated with said groups of circuits and responsive to the operation of said contact members, groups of normally rotating means respectively controlled by said selecting mechanisms, each of said means being arranged to connect one of said repeating devices directly to certain circuits of different groups and other means including a rotary stepping switch for delaying a selection of a repeating device by one of two circuits successively connected to two selecting mechanisms for obtaining the same information, until the other circuit has received the information.

10. In a telegraph system, a plurality of transmission circuits arranged in groups, a device in each of said circuits for transmitting telegraphic signals constituting a request for certain information, a plurality of receiving devices each comprising electrical contact members respectively responsive to the telegraphic signals received from any one of said groups of circuits, a plurality of repeating devices, a plurality of manually operated devices arranged to change the information to be repeated by said repeating devices, a plurality of selecting mechanisms respectively associated with said groups of circuits and respectively responsive to the operation of said members, normally rotating means controlled by one of said selecting mechanisms for connecting a calling transmission circuit directly to any desired one of said repeating means, and means including a switching key for delaying the transmission of information from said selected repeating means, in response to a request, while said manually operated devices are being operated to change the information to be repeated by said repeating devices so that the circuit over which the request is received, will receive the changed information as soon as it is changed.

11. In a telegraph system for the transmission of information, a station comprising a source of signaling current, groups of information sources arranged to transmit from said signaling source combinations of electrical current impulses corresponding to the characters of any desired information, a plurality of groups of switches for arbitrarily changing the information transmitted from said groups of information sources, a constant drive device arranged to successively operate said groups of information sources in regular rotation to produce over the operated contact of said switches desired combinations of electrical current impulses, repeating means for receiving the desired combination of electrical current impulses, and a remote station comprising a transmitting and receiving device and another source of electrical current impulses associated therewith, a line circuit interconnecting said station, a selecting mechanism at the first-mentioned station responsive to impulses from the second-mentioned impulse source for selecting the desired combinations of electrical current impulses received over said switches, and normally rotating mechanisms related to each of said groups of switches and controlled by the first-mentioned selecting mechanism for connecting one of said repeating means directly to said line circuit whereby the combination of electrical current impulses corresponding to the information desired is transmitted to said receiving device.

LELAND A. GARDNER.